United States Patent [19]
Cobb et al.

[11] 4,031,929
[45] June 28, 1977

[54] SPREADER FOR A GRANULAR PRODUCT

[76] Inventors: Wayne E. Cobb; Edward W. Cobb, both of 358 Harrison St., Valparaiso, Ind. 46383

[22] Filed: Feb. 12, 1976

[21] Appl. No.: 657,393

[52] U.S. Cl. ............................................. 239/684
[51] Int. Cl.² ........................................ A01C 19/00
[58] Field of Search .......... 239/501, 502, 503, 513, 239/681, 684, 687; 222/193, 333, 196

[56] References Cited
UNITED STATES PATENTS

| | | | |
|---|---|---|---|
| 2,862,717 | 12/1958 | Ronning | 239/681 X |
| 3,248,117 | 4/1966 | Donelson, Jr. | 239/684 |
| 3,804,303 | 4/1974 | Fassauer | 222/193 |

FOREIGN PATENTS OR APPLICATIONS 50,574  1/1941  Netherlands ...................... 239/684

OTHER PUBLICATIONS

OM-H90637H, John Deere Co., Mar. 28, 1961, pp. 1, 3, 4, 6.

Primary Examiner—Stanley H. Tollberg

[57] ABSTRACT

The subject invention involves, among other things, mounting impeller blades, of a unique design and construction, which are disposed below an outlet provided in a hopper so that the product flowing downwardly from the outlet may be spread distally in any conical pattern desired for deposit to form a pile or layer of substantially uniform depth.

22 Claims, 20 Drawing Figures

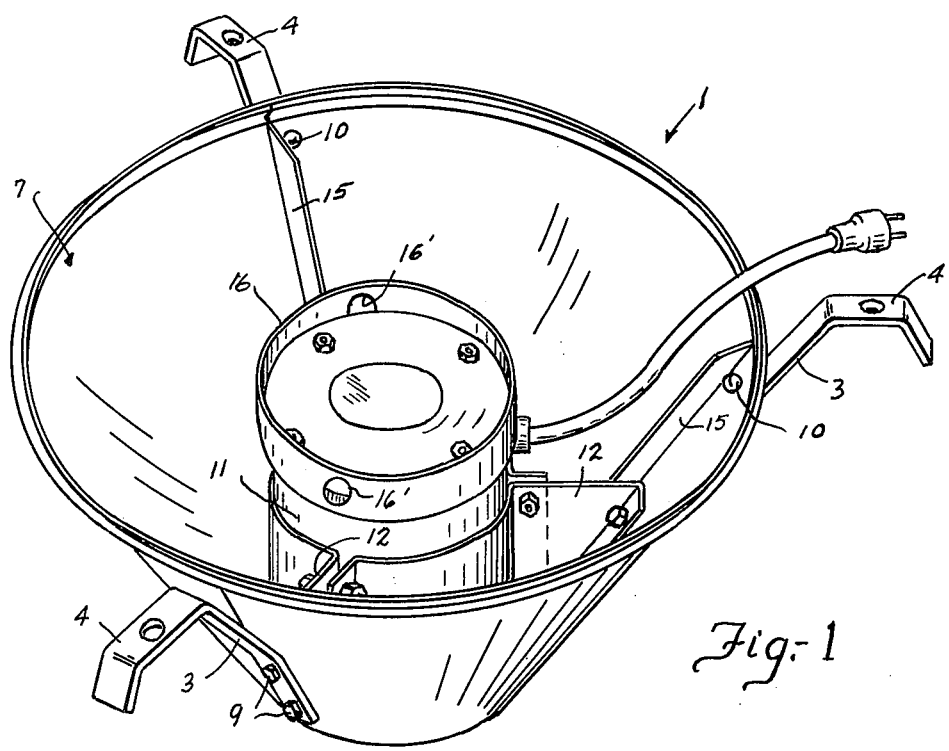
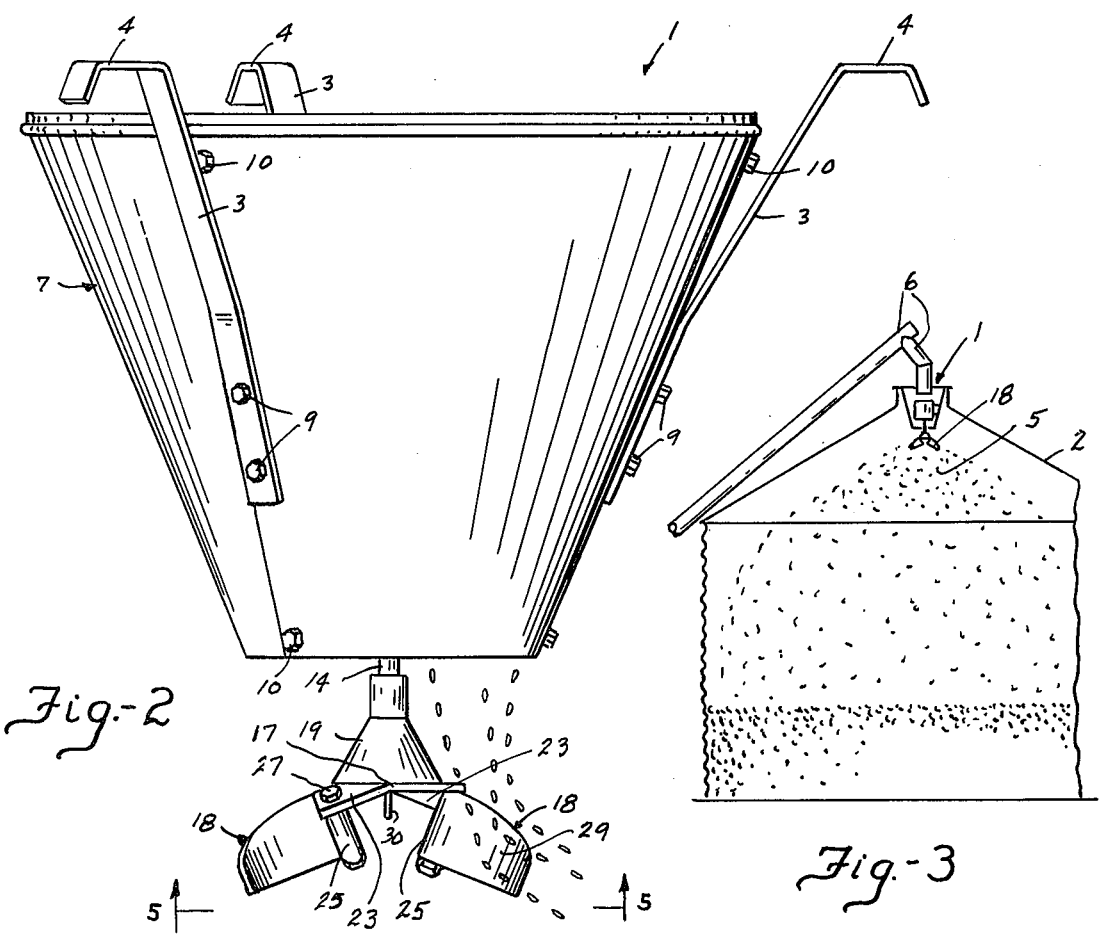

SPREADER FOR A GRANULAR PRODUCT

OBJECTIVES

In view of the foregoing, one of the principal objectives of the subject invention is to provide a machine or a spreader which preferably comprises, among other things, a hopper provided with a lower outlet, a power unit supported centrally in the hopper, rotatable shaft means operatively connected to the unit and extending through and below the outlet, a mounting carried by the shaft means, and a pair of elongated impeller blades or members which are adjustably connected to the mounting in a unique manner whereby a granular product, such as grain, received in the hopper and flowing downwardly through the outlet may be caused to spread outwardly and downwardly from the shaft means in any conical pattern desired.

More particularly, an object is to provide a first subassembly comprising the hopper, the power unit which is preferably an electric motor for directly rotating the shaft means, means for supporting the unit centrally in the hopper, and control means preferably carried by the motor which serves the dual purpose of protecting the motor from the abrasive character of the granual material during its delivery into the hopper and controlling its conical dispersion in the hopper in a manner whereby to achieve a substantially uniform distribution, particularly when a stream or column of material is being introduced at an angle into the hopper. This control means preferably comprises a cup affixed to the motor for accumulating some of the product to form what may be termed a product cone or deposit which serves to direct or divert the incoming product conically downward through an annular space between the hopper and motor unit.

Another object is to provide a second sub-assembly, thrower, or impeller structure which is adapted to be operatively connected to the first mentioned subassembly, and preferably comprises a shaft which carries the mounting, above referred to, to which the impeller blades are adjustably connected for spreading the granular material. This shaft may be referred to as a driven or secondary shaft which is connected to a primary or drive shaft of the motor. Otherwise expressed, the shaft means alluded to above may comprise the two shafts or be of a one-piece construction.

More particularly, an important objective is to provide a unique mode of adjustably fastening the blades to the mounting and this is preferably achieved by providing the mounting with offsets or portions and spindles which have upper ends respectively fixedly secured to the offsets whereby to position the spindles at inclined angles or what may be termed a generally spiral or angular relationship with reference to the longitudinal axis of the shaft. The inner ends of the impeller blades are preferably provided with tubular formations through which the spindles extend whereby to pivotally connect the blades to the spindles, and means are carried by the lower ends of the spindles for selectively exerting sufficient axial thrusts on the tubular formations whereby the blades may be automatically and firmly held in any operative positions to which they may be adjusted.

A specific but significant object of the invention is to provide blades which are preferably generally spirally curved and tapered throughout their length and connected to the spindles and/or mounting at diametrically disposed positions with respect to the longitudinal axis of the driven shaft which carries the mounting so that the product flowing downwardly through the outlet will engage outer or convexly curved surfaces of the blades and be directed outwardly and downwardly, thereby to substantially uniformly distribute or spread the product for deposit in a pile or layer of substantially uniform depth, and due to the adjustability of the blades the diameter or area of distribution may be varied to meet various conditions, such as, for example, providing a pattern of distribution for storage in bins of variable diameters or cross-dimensions.

Another specific object of the invention is to provide a setup, which may include a centering device preferably in the form of a pin extending from the driven shaft carrying the mounting so that the blades can be readily pivotally adjusted to predetermined distal positions with respect to the pin in order that the outer extremities of the blades can be readily correctly equally spaced therefrom to facilitate balancing of the blades. When the blades are adjusted so that the distances between the outer tips of the blades and the pin are increased the centrifugal force imparted to the product by the blades will increase to obtain a greater conical spread of the product and a decrease in the forces and spread will result when the tips are correctly disposed closer to the pin.

A further object is to provide the hopper with circumferentially spaced internal abutment means which to promote axial flow of the product through the outlet of the hopper.

A particular object of the invention is to provide the second subassembly with means, preferably in the form of a conical control which is carried by the second shaft at a location above the blades whereby to protect the connections between the inner ends of the blades and mounting and assist in directing the product after it flows through the outlet against the outer extremities of the blades. This control also serves to prevent damage to the product.

Other objects and advantages reside in providing a spreader which is efficient, durable and comprised of a minimum number of components which can be economically manufactured, assembled and readily adjusted.

Additional objects and advantages of the invention will become apparent after the description hereafter set forth is considered in conjunction with the drawings annexed hereto.

DRAWINGS

In the drawings:

FIG. 1 is a pictorial view of a spreader structure embodying the subject invention:

FIG. 2 is a front elevational view of the spreader depicted in FIG. 1;

FIG. 3 is a vertical view of a storage bin showing the operative relationship of the spreader therewith;

DESCRIPTION

Figure 4:
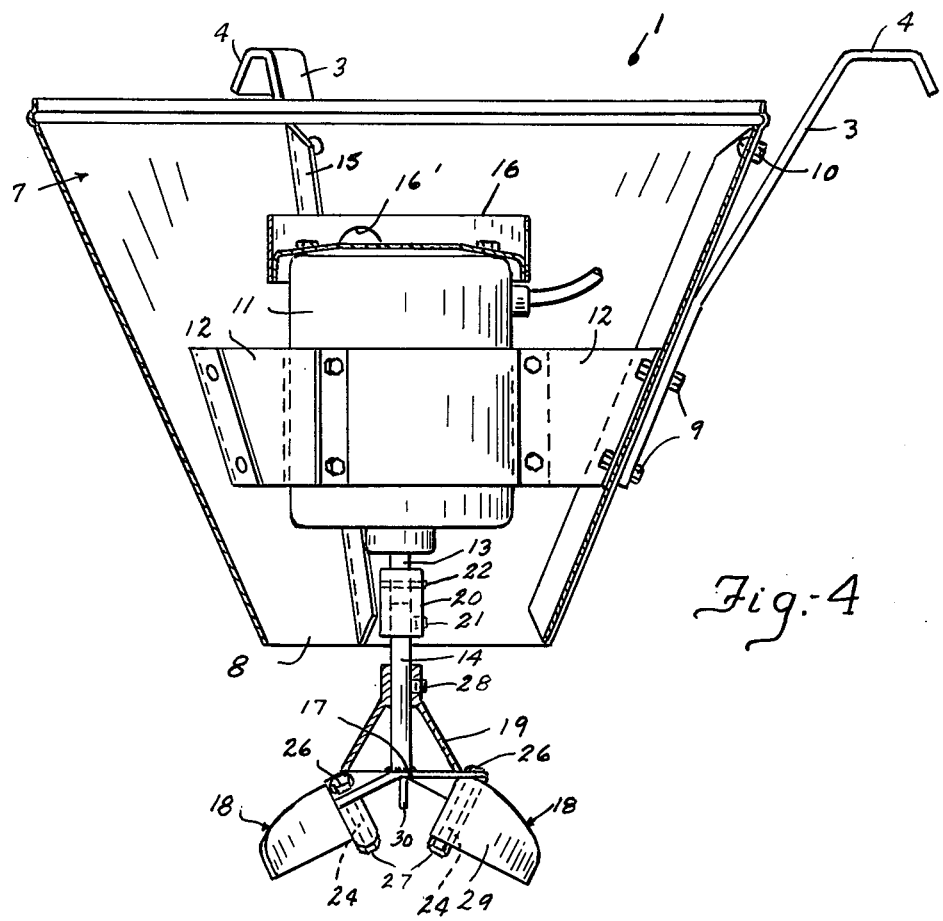
FIG. 4 is an elevational view similar to FIG. 2 with portions of the spreader in section to illustrate details of the construction.

The spreader, generally designated 1, embodying the subject invention may be utilized where desired but as exemplified in FIG. 3 it is depicted for use in an inlet or opening at the top of a large storage bin or facility 2. More particularly the spreader is preferably mounted on the bin by three supports 3 which are carried by the spreader and have upper offset ends 4 which hook over or reset on a rim portion of the bin defining the opening and lower extremities which are bolted or otherwise secured to the wall of the bin for supporting and suspending the spreader in the bin.

A granular product, such as grain 5 is fed into the hopper by a conduit 6 which customarily delivers a column or stream of the product vertically downward or at an angle into the hopper at a relatively high rate of flow.

The spreader may be designed and constructed in various ways but as shown in FIGS. 1, 2 and 4 it preferably comprises a hopper generally designated 7 of a conical or funnel shape having a lower outlet orifice or opening 8 through which a granular produuct received in the hopper is discharged. This hopper comprises wall structure preferably made of sheet metal and may be formed from a single or several sheets of such material. As depicted it is comprised of three sections secured together by pairs of bolts 9 and single bolts 10.

A power unit preferably in the form of an electric motor 11 is supported centrally in the hopper by three equally spaced apart radial brackets 12 which have outer portions which are detachably secured against the inner conical surface of the hopper and inner portions which detachably embrace the motor in a conventional way for suspending it centrally in the hopper so that there is an appreciable substantially annular space about the motor. The brackets have planar portions which constitute partitions to divide the annular space into three flow areas whereby to provide a substantially uniform axial flow of the product to the outlet and thereby substantially prevent swirling or vortexing of the product in the hopper. The motor is connectible with a source of electricity through an extension cord as shown and is provided with a depending drive shaft 13 which is adapted to be coupled with a driven or second shaft 14.

The hopper is preferably provided with three inner relatively narrow abutments or flanges 15 which are secured in a circumferentially spaced longitudinal relationship by the bolts 9 and 10, and as shown, the pair of bolts 9 secure outer flanges of the brackets 12 to the hopper. These abutments serve to reinforce the hopper and promote linear or axial flow of the product through the hopper in addition to that afforded by the brackets. It should be noted that the pairs of bolts or fastening means 9 serve the three-fold purpose of securing the sections together and the brackets and abutments to the sections.

Also, as described by the Applicant;

"The flange or flanges on the inner edge of the hopper section that protrude or extend about radially inward serve as an anti-vortex elements to help prevent the incoming high velocity grain from swirling in the hopper, thereby providing laminar or non-turbulent flow out the lower hopper orifice. Maximum throughput capacity of the hopper can only be attained by laminar or non-swirling flow out the orifice. Thereby the smallest orifice size may be used for a given capacity. This deposits the grain in a smaller area of the grain throwing mechanism and consequently it will treat all grain nearly the same since it all falls nearly the same place on the thrower, and it is thrown nearly the same all around a bin for equal distribution."

As alluded to above, one of the objects of the subject invention is to provide control means for protecting the motor against damage incurred by the abrasive action of the granular product flowing into the hopper and this is preferably achieved by providing the motor with a cover or shield, preferably in the form of a cup or cap 16. This cover or means is preferably designed and constructed to cause most of the incoming product to be disrupted or diverted in its flow for dispersion or distribution in the hopper and thereby substantially prevents what may be termed swirling and/or an excessive or uneven build-up of the product in the hopper at a location opposite the discharge end of the conduit 6 feeding the product to the hopper, particularly in those instances in which the discharge end is located at an angle with reference to the vertical axis of the hopper. The hopper 7, supports 3, motor unit 11 and drive shaft 13, brackets 12, abutments 15, and control 16 of the spreader comprise what may be termed a first subassembly, which is adapted to be coupled or operatively connected to a second subassembly.

Figure 6:
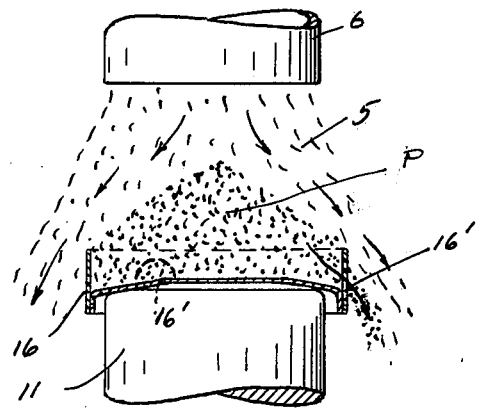
FIG. 6 is a pictorial view showing the operative relationship of an inflow conduit with a control means disposed in a hopper of the spreader.

The control means 16 also serves to collect some of the product and provide a buildup, a body, or product cone P which points in whatever direction of the flow of the product as evidenced in FIG. 6. This pointing will vary depending on the direction of inflow. This setup is considered unique and constitutes a meritorious advance in the art, because the product cone serves the dual purposes of controlling the conical spread of the product and protects the cup which supports the cone. Of further significance is the fact that the cup is preferably provided with side openings or apertures 16' through which some of the cone or water therefrom may flow, as shown in FIG. 6, in order to assist in maintaining a cone in a fresh or relative stable condition until the inflow of the product terminates, in which event, the cone automatically disentegrates or falls away. It is to be understood that the control means 16 may be utilized without being supported on or for use with a motor.

More specifically, as described by the Applicant:

"The cap not only protects the motor, if there is one there, but serves as a grain divider to distribute the flow of incoming grain equally around to provide an even and consistent flow out of the lower orifice of the hopper and equal distribution of the outflowing material across the plane of exit of the hopper. The cap can either rotate or be stationary and have an upwardly extending rim on it, or be concave, cup shaped or hemispherical shape to contain some grain. When a stream of grain is directed toward the cap the contained grain in the cap becomes relatively stationary except for the small leakage through the apertures that may be provided. The stationary grain takes the shape of a conical solid extending into the center of the oncoming stream of grain, thereby splitting or dividing it to provide equal amounts to be distributed around the cap. The stationary cone of grain, supported by the cap, is capable of shifting position as the oncoming stream of grain changes position or angular direction and will always reform itself, or automatically adjust itself, so that the conical mass of grain points directly into the center of the oncoming stream of grain and consequently it effectively "divides" the stream to provide equal amounts of grain to flow around the concave cap obstruction. Since the stationary cone of grain is subject to impact, abrasion, accumulation of fines and moistures some holes, (apertures, perforations, slots, slits,) in the cap bottom or sides provide for some leakage and slow circulation and replacement of the conical, relatively stationary, grain mass contained on top of the cap. Also, so that the conical mass of grain can collapse or drain away when not in use as well as for water drainage to prevent spoilage. It eliminates the harsh glancing blows and grain damage attributed to the flat or convex flow dividers used in the past and reduces random bouncing of kernels that spray in various directions that are difficult to contain."

The second subassembly may be designed and constructed in various ways as illustrated in FIGS. 2, 4 and preferably comprises, amount other things, the driven or second shaft 14 which is provided with a mounting 17 to which a pair of impeller blades or members respectively generally designated 18 are adjustably connected, and a control 19 which is carried by the shaft at a location above the blades.

This driven shaft 14 is preferably detachably connected to the drive shaft 13 of the motor by a cylindrical sleeve 20 which receives and is fixedly secured to an upper end of the shaft 14 by any means suitable for the purpose, such as extending a set screw 21 through the sleeve for engaging a flattened portion (not shown). This sleeve may be fixedly secured to the drive shaft 13 by a pin 22. With this arrangement the shafts will rotate in unison.

The mounting 17 preferably comprises a rectangular metal member having a center portion which is preferably welded to the lower end of the driven shaft 14 so that extremities 23 of the mounting member extend generally radially outward from the longitudinal axis of the shaft. These extremities or portions of the mounting member are provided with generally triangular offsets which are angularly disposeed or inclined in planes with reference to the center portion of the member and/or the longitudinal axis of the shaft; and particularly downwardly in directions opposite to that of the shafts rotation. These offsets or extremities are preferably provided with apertures through which a pair of spindles 24, preferably in the form of bolts extend to locate the spindles so they are inclined in the direction that the impellers rotate. More specifically in this respect, the shanks of the spindles also extend through tubular formations 25 provided on the inner ends of the impeller blades 18. The shanks have hexagonal heads 26 and threaded ends carrying nuts 27. With this setup when the bolts are tightened, these tubular formations 25 may be selectively, adjustably and firmly secured or clampled between the lower surfaces of the offsets and the nuts 27 in such a way that the blades may be automatically held in the positions to which they are adjusted. The pressure exerted by this organization may serve the aforesaid purpose or if so desired the bolts may be loosened to facilitate adjustment of the blades and then tightened. The spindles 24 are preferably inclined at angles within a range of between 14° and 60° in the direction that the impeller structure rotates.

The blades which direct the product outwardly may be designed and constructed as desired for the purpose intended but each is preferably elongated, tapered and generally spirally curved throughout its length, and due to their connections with the inclined spindles they are angularly disposed or tilt in the direction the impeller structure rotates, and cause the product to be dispersed outwardly and downwardly or in a substantially conical pattern for deposit in a bin on a surface in a substantially uniform layer or depth as depicted in FIG. 3.

In order to assist in the distribution of the product, the second subassembly or impeller structure preferably includes the control 19 which is of a conical character. It is adjustably secured to the driven shaft by providing the control with a tubular extension through which the shaft 14 extends to dispose the control centrally on the shaft. This control is secured to the shaft by a set screw 28. This control which is located above the blades serves to protect the adjustable connections between the blades 18 and mounting 17, and more importantly serves to spread the product flowing through the outlet in the bin outwardly in a generally conical pattern so it will be more efficiently picked up by the blades for dispersion into the bin. With this unique organization of components the product is initially spread in the hopper by the control means 16 and/or the product cone P and subsequently by the control 19 to the impeller blades so one may state that there is two step dispersion of the product, one within the confines of the hopper and one externally and therebelow, thereby promoting the efficiency of the spreader. It should also be manifest that the brackets 12 and abutments 15 in conjunction with the control means 16 serve to promote axial flow of the product through the hopper, as well as impart stability to the hopper.

Figure 5:
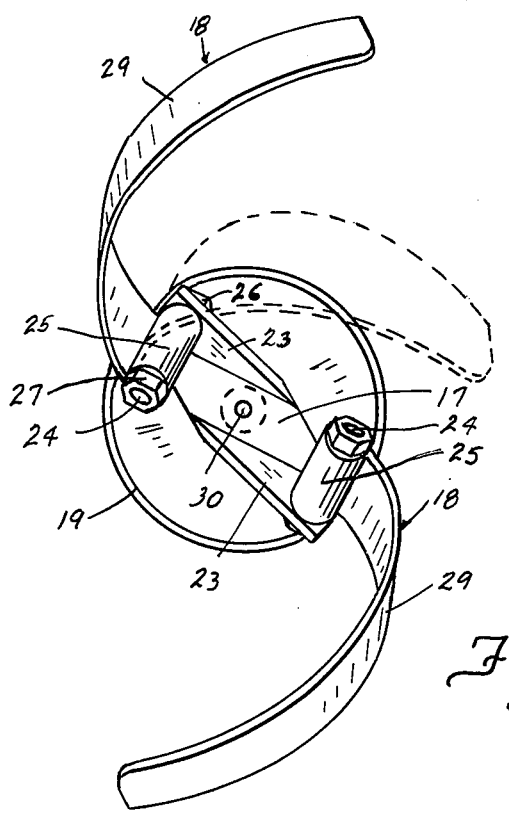
FIG. 5 is an enlarged bottom view of the impeller structure of the spreader.

As stated above the impeller blades 18 are selectively adjustable on the spindles 25 or pivot means, whereby the conical spread of the product may be readily adjusted outwardly to increase the conical spread of the product or inwardly to decrease the spread. The blades respectively have what may be termed a compound curve or one which is of a spiral or involute character and which progressively tapers outwardly. Due to the fact that the blades are tilted or inclined in the direction that the impeller structure rotates and that they curve about the axis of the shaft means, which is preferably rotated in a clockwise direction as indicated by the arrows in FIGS. 2 and 5, the outer convex impact surfaces 29 of the blades will engage the product and direct it outwardly and downwardly.

In order to facilitate adjustment of the blades the mounting 17 is preferably provided with an axial depending pin 30 and the free ends or tips of the blades can be adjusted to the correct radial distances desired from this pin. As alluded to above, the blades can be adjusted to vary the velocity and/or conical spread of the product. The rotation of the impeller structure in a clockwise direction as alluded to above causes the outer curved surfaces of the blades to forcibly engage and direct at least some of the product directed thereto by the control 19 to flow outwardly and downwardly. Obviously, all of the product discharged through the outlet in the hopper is not subjected to the control 19 as some may fall directly against the blades. The rotational speed of the impeller structure may vary within a range of between 400 R.P.M. and 2000 R.P.M. but a speed of around 1750 R.P.M. has proven desirable in obtaining a diametrical spread of the product within a range of between 14' and 60'.

As described by the Applicant:

"The adjustable impellers turned by the driven shaft throw the grain in a conical scattering motion. The impeller throwing element or fin is adjustable to impart varying velocities and varying directions to the spread grain kernels. When the impellers are extended to their maximum position from the center of rotation, they have the highest peripheral speed to throw the grain at higher velocities and they have an almost vertical contact surface with the thrown grain resulting in a horizontal direction imparted to the thrown grain for maximum range. When the impellers are retracted to their minimum spread capacity, they are wrapped across the smallest diameter of rotation. The peripheral speed is lowest and consequently imparts the least speed to the grain contacted, throwing it at the lowest velocity. Also, in the retracted position the angle of the contacting surface with the grain is inclined downward, that throws the grain outwardly and downwardly to reduce the effective spread diameter. In this retracted position, the major part of the spreading is done by the inner portions of the impellers that are nearest the center of the rotation and accordingly move the slowest. The extended ends cut through the grain stream with their edge and do not plow through the downcoming grain stream with their broad face as they do in the extended position.

This is all accomplished by the adjusting axis of the two impeller fins being in vertical parallel planes, equidistant from either side of, and parallel to the main axis of rotation and are inclined in those planes into the direction of rotation at their top end with respect to the axis of rotation, and by virtue of the impellers each having a compound curvature."

Having thus described our invention, it is obvious that various modifications may be made in the same without departing from the spirit of the invention and, therefore, we do not wish to be understood as limiting ourselves to the exact forms, constructions, arrangements, and combinations of components as herein shown and described.

We claim:

1. A spreader for spreading a flowable granular product, said spreader comprising a hopper provided with a lower substantially unobstructed outlet, elongated shaft means supported by said hopper vertically through said outlet, said shaft means having an upper extremity disposed in the hopper for connection with means for rotating the shaft means and a lower extremity, a mounting carried by said lower extremity for rotation with said shaft means, a pair of elongated curved blades which are generally curved about the longitudinal axis of said shaft means, said blades having inner ends and outer free ends, and means connecting and securing only said inner ends to said mounting for pivotal adjustment at substantially diametrically disposed locations with respect to said axis of said shaft means, the arrangement being such that when the blades are adjusted to locate their free ends closer to said axis and said shaft means, mounting and blades are rotated as a unit and a product flows through the outlet the blades will direct the product for deposit in a smaller area about said axis then when said free ends are located a greater distance from said axis.

2. A subassembly for use as a component in a spreader for a granular product, said subassembly comprising a shaft adapted for rotation which has one end provided with means facilitating its connection to a power unit and an opposite end provided with a mounting, a pair of spindles connected to said mounting on opposite side of the longitudinal axis of said shaft and being tilted in the direction of the shafts rotation, a pair of elongated blades which are curved substantially throughout the major portions of their length and have inner ends and outer extremities, and means for respectively adjustably fastening only said inner ends to said spindles whereby said outer extremities may be located variable radial distances from said axis so that when the subassembly is utilized the blades may be caused to vary the outward flow range of at least some of the product with respect to said axis.

3. The subassembly defined in claim 2, including a power unit connected to said one end of said shaft, and means for protecting at least a portion of said unit from wear which would otherwise be imparted thereto from the flow of a product thereagainst.

4. The subassembly defined in claim 2, in which said inner ends of said blades are provided with tubular formations which pivotally receive said spindles.

5. A subassembly for use as a component in a spreader for a granular product, said subassembly comprising a shaft adapted for rotation which has one end provided with means facilitating its connection to a power unit and an opposite end provided with a mounting having portions which are offset in a direction opposite to that of the shafts rotation, a pair of spindles connected to said offset portions on opposite sides of the longitudinal axis of said shaft and being tilted in the direction of the shafts rotation, a pair of elongated blades which are curved substantially throughout the major portions of their length and having inner ends and outer extremities, and means for respectively adjustably fastening said inner ends to said spindles whereby said outer extremities may be located variable radial distances from said axis so that when the subassembly is utilized the blades may be caused to vary the outward flow range of at least some of the product with respect to said axis.

6. A subassembly for use as a compartment in a spreader for a granular product, said subassembly comprising a shaft adapted for rotation which has one end provided with means facilitating its connection to a power unit and an opposite end provided with a mounting, a pair of spindles connected to said mounting on opposite sides of the longitudinal axis of said shaft and being tilted in the direction of the shafts rotation, a pair of elongated blades which are curved substantially throughout the major portions of their length and have inner ends and outer extremities, means carried by said shaft for disposition above the blades for directing the product in a predetermined flow pattern toward said blades, and means for respectively adjustably fastening said inner ends to said spindles whereby said outer extremities may be located variable radial distances from said axis so that when the subassembly is utilized the blades may be caused to vary the outward flow range of at least some of the product with respect to said axis.

7. Structure for use as a component of a spreader for a flowable granular product, said structure comprising a mounting adapted for connection with a shaft for rotation about its longitudinal axis, a pair of elongated blades having inner ends and at least curved outer extremities, and means for respectively connecting said ends to said mounting at diametrically spaced locations with respect to said axis whereby to position said extremities in a depending relation to said mounting in a generally tilted spiral relationship with respect to said axis, said connecting means also providing the sole means for locating said extremities variable distances from said axis.

8. A subassembly constituting a component of a spreaer for a granular product, said subassembly comprising a rotatable shaft provided with a mounting, a pair of elongated tilted tapered curved impeller blades for directing such a product in a conical pattern, and means adjustably clamping said blades to said mounting at diametrically spaced locations from the longitudinal axis of said shaft in a manner whereby they may be caused to vary the diameter of the pattern.

9. The subassembly defined in claim 8, in which said clamping means includes a pair of spindles which are secured to said mounting at inclined angles with respect to the axis for tilting said blades in the direction that the shaft is adapted to rotate.

10. A subassembly for use as a component of a spreader for a flowable granular product, said subassembly comprising a shaft adapted for rotation in one direction about its longitudinal axis, a mounting carried by said shaft, a pair of elongated impellers having inner ends and at least tapered curved outer extremities, means adjustably connecting only said inner ends to said mounting at locations on opposite sides of said axis in a manner whereby to locate said outer extremities in a generally tilted relationship below and outwardly from said mounting and with respect to said axis for engaging and spreading such a product in any one of an infinite number of conical patterns.

11. A subassembly for use in a spreader for a granular product, said subassembly comprising a hopper provided with a lower outlet, an electrical power unit enclosed in a housing supported centrally in said hopper, and means carried by an upper portion of said housing serving to collect some of the product to substantially form an upstanding conical formation of the latter so that it protects said housing from the abrasive action of the product flowing through the hopper.

12. The subassembly defined in 11, including a shaft which is connected to said power unit and extends downwardly therefrom through said outlet, impeller means operatively connected to said shaft for spreading the product after it flows through the outlet, and means whereby said impeller means may be adjusted to vary the spreading range.

13. A subassembly comprising wall structure forming a conical hopper having a lower outlet through which a granular product introduced into the hopper may flow, a power unit, means supporting said unit centrally in said hopper, shaft means driven by said unit and extending downwardly through said outlet, and cup means disposed in an upper protective relation to said unit for retaining at least some of the product in a central conical formation so the latter serves to direct most of such a product therefrom.

14. The subassembly defined in claim 13, in which said supporting means comprising a plurality of circumferentially spaced brackets having radially extending planar portions which serve to promote linear flow of the product through the hopper.

15. The subassembly defined in claim 13, in which said wall structure is comprised of a plurality of sections secured together by fastening means, and a plurality of circumferentially spaced longitudinally extending inner abutments are secured to said sections by said fastening means whereby to promote linear flow of the product through the hopper.

16. The subassembly defined in claim 14, in which said wall structure is comprised of a plurality of sections secured together by fastening means, and a plurality of circumferentially spaced longitudinally extending inner abutments are also secured to said wall structure by said fastening means for promoting the linear flow of the product through the hopper.

17. The subassembly defined in claim 16, including a plurality circumferentially spaced longitudinally extending outer supports which are secured to said wall structure by said fastening means.

18. The subassembly defined in claim 13, including an impeller structure secured to said shaft means for disposition below the outlet, and a control is interposed between said outlet and said impeller structure for directing such a product flowing through the outlet to said impeller structure for spreading thereby.

19. The subassembly defined in claim 13, including an impeller structure which is carried by said shaft means and comprises a mounting affixed to the shaft means, a pair of spindles which are respectively secured to said mounting on opposite sides of the shaft means and inclined in the direction that the shaft means is adapted to rotate, and elongated curved impeller blades are secured to said spindles in a generally spiral relationship with respect to the longitudinal axis of said shaft means for directing such a product in a generally conical pattern as it flows downwardly through the outlet.

20. A subassembly for use as a component of a device for spreading a granular product, said subassembly comprising a hopper for receiving such a product from a conduit and having a lower extremity which tapers into a lower central outlet, stationary means supported substantially centrally in said hopper above said outlet, said means being in the form of a cup to receive some of the product to form a substantially conical body which serves to control the flow of most of the product toward said outlet.

21. The subassembly defined in claim 20, in which said body when formed points generally in a direction opposite to that that the product flows through the conduit into the hopper.

22. A rotatable subassembly comprising a shaft, a mounting carried by said shaft, a pair of spindles respectively carried by said mounting and disposed on opposite sides of the longitudinal axis of said shaft, said spindles being tilted in the direction that the subassembly is rotated, curved impeller blades adjustably connected to said spindles for locating said blades in a general spiral relation with respect to said axis, and means extending from said shaft between said spindles whereby the blades may be adjusted to variable corresponding distances from said extending means.

* * * * *